March 22, 1949.  J. J. NEFF  2,465,032
ELECTRONIC GAUGE
Filed July 28, 1945  2 Sheets-Sheet 1
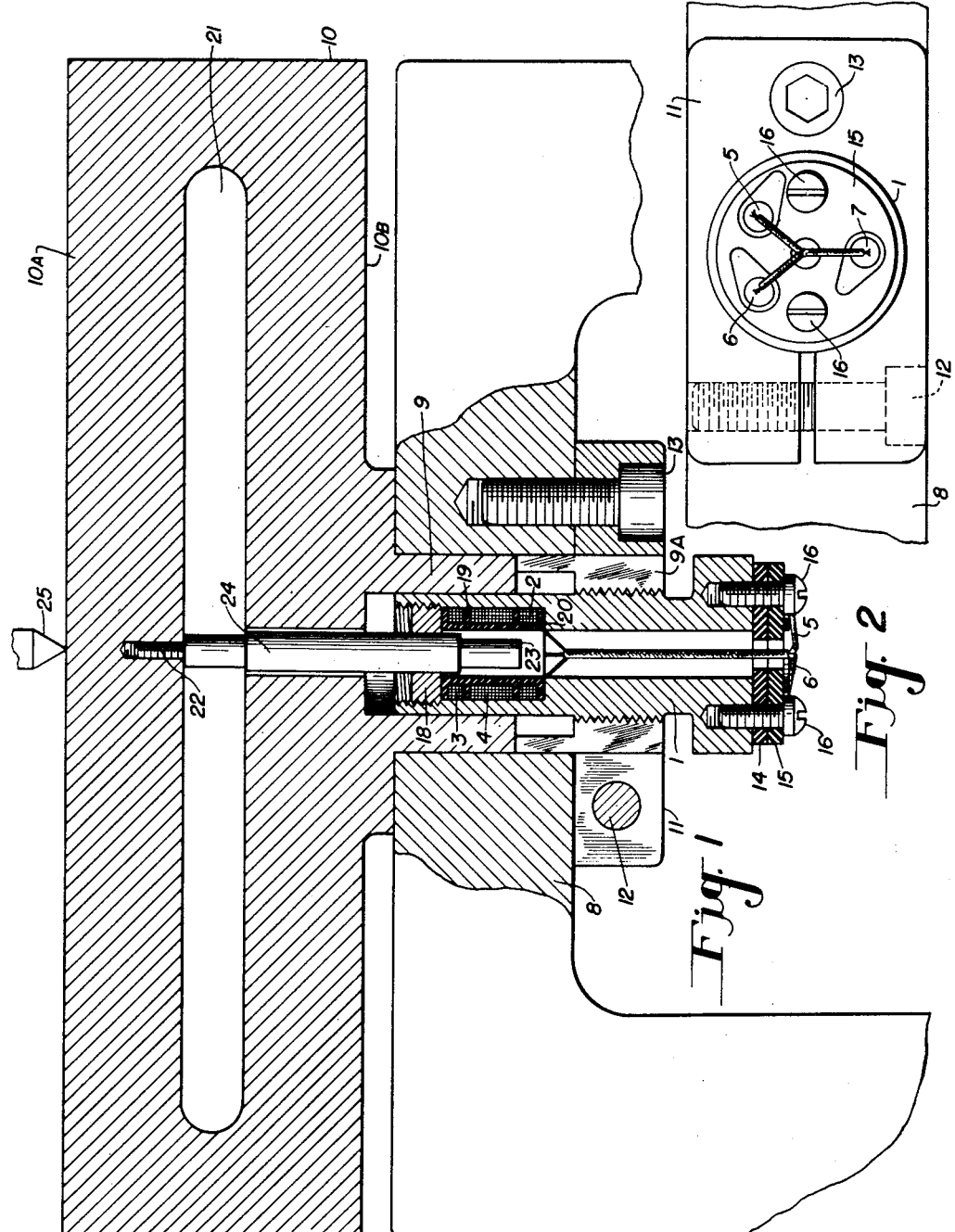
INVENTOR.
JOSEPH J. NEFF
BY
Frank H. Harmon
ATTORNEY March 22, 1949.  J. J. NEFF  2,465,032
ELECTRONIC GAUGE
Filed July 28, 1945  2 Sheets-Sheet 2

INVENTOR.
JOSEPH J. NEFF
BY
Frank H. Harmon
ATTORNEY

UNITED STATES PATENT OFFICE 2,465,032

ELECTRONIC GAUGE

Joseph J. Neff, South Euclid, Ohio, assignor, by mesne assignments, to Jack & Heintz Precision Industries, Inc., Cleveland, Ohio, a corporation of Delaware Application July 28, 1945, Serial No. 607,532

5 Claims. (Cl. 171—119)

This invention relates to electronic gauges and has for its object to provide an improved electronic gauge by the use of which weights of mass or a force or torque may be measured and indicated in easily visible indicia representing increments of small differentials for obtaining a high degree of precision.

With the foregoing and other objects in view the invention consists in the combination of parts and in the details of construction hereinafter set forth in the following specification and appended claims, certain embodiments thereof being illustrated in the accompanying drawings, in which:

Figure 1 is a fragmentary view in vertical section of the measuring device including the split compressible beam and the displacement pickup mechanism with its coils and armature;

Figure 2 is a view in bottom plan of the wire outlets from the displacement mechanism.

Figure 3:
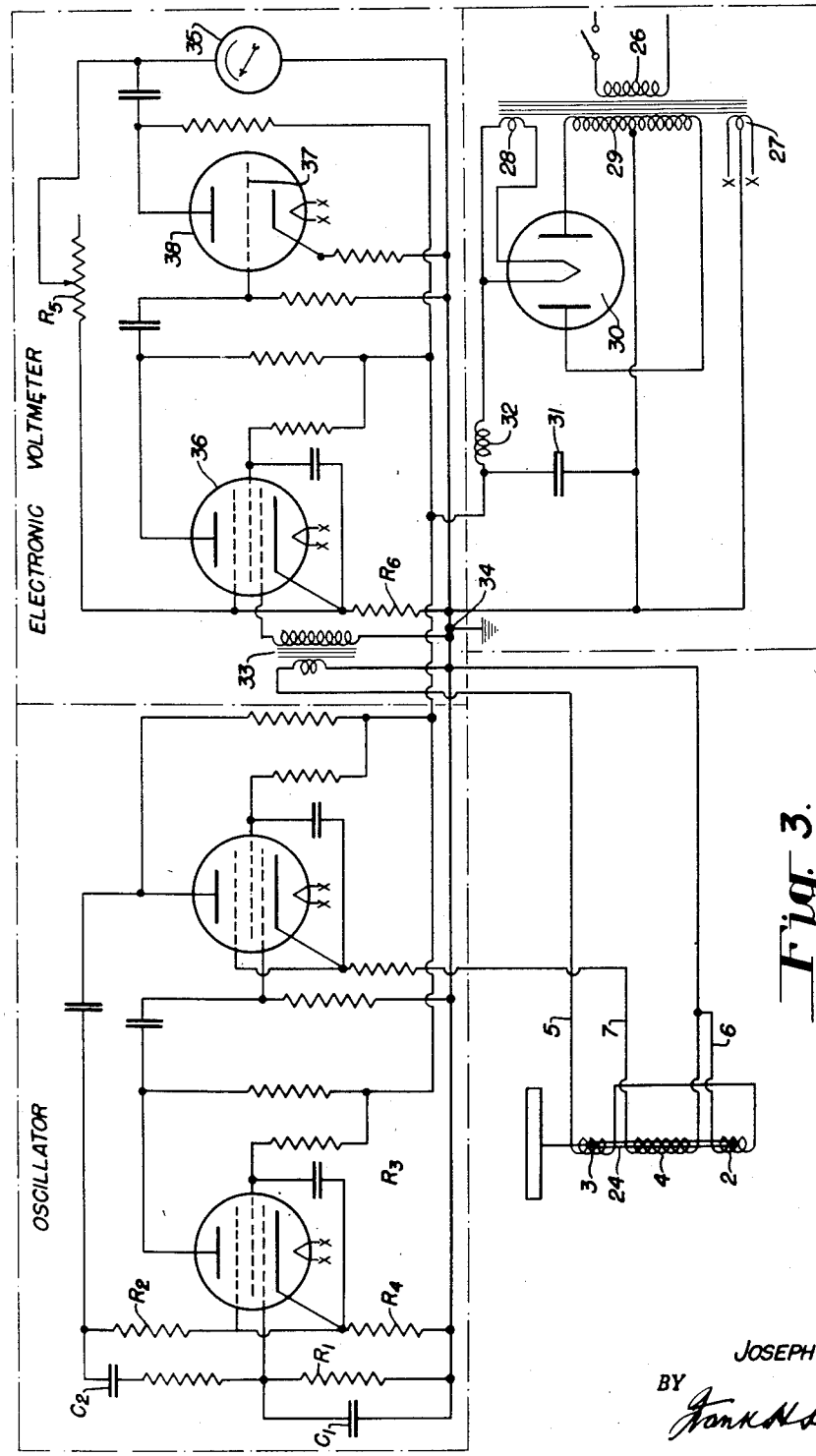
Figure 3 is a circuit diagram for the displacement pickup instrument including a resistance condenser tuned oscillator and electronic voltmeter.

Referring more particularly to the drawings, a nonconducting casing, in the form of a hollow plug 1, is shown supporting two pickup coils 2 and 3 and an intermediate driving coil 4 with contact outlets 5, 6 and 7.

The base 8 has a bore to receive the downwardly depending portion 9 of a metallic bar 10 whose surface surrounding the bore rests on the top of the base. The lower portion 9A of element 9 is split and provided with interior screw threads. Plug 1 has a portion exteriorly screw threaded to be adjustably screwed into portion 9A around which is removably clamped a split clamping ring 11 which is secured to the under surface of base 8 by a screw bolt 13 and radially clamped by a bolt 12. The outlet contacts are held in place in the bottom of the plug by washers 14 and 15 and bolts 16. The upper surface of the plug is also interiorly screw threaded to receive an adjustment plug 18 which bears down on the upper surface of the retainer 19 for the coils 2, 3 and 4 to force the lower surface of coil retainer 19 on the inner shoulder 20 of the plug.

Depending upon the greatness of the weight or force or torque to be measured, the bar 10 may be a solid bar, a split bar or a bar of two separate parts. In each case the bar is springy to resiliently resist compression and assume its normal position upon release of weight, force or torque.

For illustrative purposes the bar 10 is shown formed with an elongated slot 21 rendering the upper portion 10A, through the medium of the interior slot 21, resiliently movable toward the the lower portion 10B of the bar 10. Adjustably secured in interior screw threads 22 in the upper bar portion 10A is an armature 24 which extends downwardly in plug 1 in centralized spaced position inside of coil retainer 19 and its cores 2, 3 and 4. The lower portion 23 of armature 24 is of lesser diameter. The object 25 is centralized with respect to the concentric axes of the armature and the coils and represents either a static mass whose weight it is desired to measure and indicate or an applied force or torque which it is desired to measure and indicate.

The preferable manner of assembly is to first screw the armature into the screw threads 22 of the bar. The plug before insertion into the assembly has placed therein the retainer 19 with its coils 2, 3 and 4 and the adjustment nut 18 screwed down to firmly hold the retainer 19 in the plug against the interior shoulder 20. Then the plug is screwed into the split portion 9A with the wires from the coils drawn through the center of the plug. The split clamping ring 11 is maintained in place by bolt 13. As soon as the proper adjustment of the plug in portion 9A is made the ring 11 is clamped by bolt 12 which clamps the screw threaded split portion 9A into firmly locked engagement with the plug.

The proper adjustment of the adjustable devices described properly centers the armature electrically with respect to the three coils and voltages which may be induced in pickup coils 2 and 3 are equal and opposed as a result of the coil connections, thereby neutralizing the effect of the pickup mechanism on the voltmeter, yet to be described, so as to obtain a zero reading. When pressure, either the weight of member 25 or a driving force or torque, is downwarly applied on the upper portion 10A of bar 10, this upper portion, by reason of slot 21, physically moves downwardly toward the lower bar portion 10B against the inherent springiness of the bar whether it is solid or provided with slot 21. The upper bar portion carries the armature and hence the latter is moved downwardly from its electrical center position of Figure 1 so that voltages induced in coils 2 and 3 by driving coil 4 will become unequal. This difference in voltage may be measured by an electronic voltmeter. The difference in the magnitude of the induced voltages in coils 2 and 3 which results as the armature moves downwardly from its electrical center position is caused by the difference in the lines of force of the field, created by driving coil 4 cutting those of pickup coils 2 and 3. These lines of force are carried by the armature which forms a part of the field pattern of the driving coil. Thus the armature as it moves down moves the magnetic field of driving coil 4 down so that more lines of force are then cutting coil 3 than coil 2 and consequently more voltage is induced in coil 3 than in coil 2.

Alternating current for energizing the driving coil is received from a conventional resistance-capacity tuned oscillator which forms a part of the circuit shown in Figure 3. This circuit is connected by means of a transformer to a standard 110 volt 60 cycle source 26 as shown in the lower right extremity of Figure 3. The alternating current as received by the transformer is rectified by a full wave rectifier 30, and the resulting current is then filtered by a filter circuit consisting of a condenser 31 and a high reactance inductance 32 so that direct current is supplied to the plates and grids of the various tubes of the oscillator and the voltmeter. The series-parallel arrangement formed by condenser $C_2$ and resistor $R_2$ and the condenser $C_1$ and resistor $R_1$ in the oscillator circuit is a positive feedback network which determines the frequency of oscillation of the oscillator. Resistors $R_3$ and $R_4$ form a negative feedback network which stabilizes the frequency and amplitude of oscillation.

Any induced voltage differential occurring between coils 2 and 3, due to downward movement of the armature 24 from the electrical center of the three coils, as shown in Figure 1, may be measured by a conventional electronic voltmeter such as shown at 35 in Figure 3. For convenience of reference the lines leading from contact outlets 5, 6 and 7 are numbered 5, 6 and 7. Lines 5 and 6 are shown connecting the coils to a step-up transformer 33. Line 6 is also shown grounded at point 34 in the circuit. Since the downward displacement, or compression of beam 10 is relatively small for weight or torque applied through member 25 downwardly thereon, the electronic voltmeter must be able to detect any voltage difference caused by very minute displacements of the armature with respect to the coils. For this purpose an amplifier 36 is utilized in the voltmeter circuit. This amplifier controls the voltage of grid 37 in a triode 38. A milliameter 35 is shown inserted in the circuit between the plate and cathode of the triode. Resistors $R_5$ and $R_6$ form a negative feedback network which stabilizes the amplification of the electronic voltmeter. Variable resistor, $R_5$, forms a shunt path for the milliameter 35 and is used to adjust its sensitivity.

In order to read directly from the meter 35 the amount of weight, force or torque, the scale of the meter may be calibrated in increments of ten thousandth's of an inch, but it is understood that the calibration and sensitivity required depend upon the type of weight or torque to be measured. The meter is of a convention style with zero milliamperes shown on the extreme left of the indicating scale and a full scale reading shown on the extreme right.

I claim:

1. A transmitter for use in a system for telemetering a condition, said transmitter comprising a base, a member supported by and adjustably secured to said base and having a bore therein and having a lower split and interiorly screw threaded portion, a hollow bore plug receiving therein a driving coil and a pickup coil on each side thereof, means for adjusting and retaining said coils in position in said plug, said plug being adjustably secured in said member, an outlet and contact members for the windings of said coils, said member being provided with an interior slot rendering the same compliant to a predetermined degree toward said base, an armature carried by the relatively compliant portion of said member and extending concentrically into said plug and with respect to the axis of said coils to a degree predeterminable by the adjustment of said plug in said member, said member being adapted to receive a gravitational or other force or torque applied on said bar coincidentally with the axes of said armature and coils, said armature upon application of a force or torque on said bar being adapted to be shifted from its electrical zero center with respect to said coils.

2. A transmitter for use in a system for telemetering a condition, said transmitter comprising a base, a member supported by and adjustably secured to said base and having a bore therein and having a lower split and interiorly screw threaded portion, a hollow bore plug receiving therein a driving coil and a pickup coil on each side thereof, means for adjusting and retaining said coils in position in said plug, said plug being adjustably secured in said member, an outlet and contact members for the windings of said coils, said member being provided with an interior slot rendering the same compliant to a predetermined degree toward said base, an armature carried by the relatively compliant portion of said member and extending concentrically into said plug and with respect to the axis of said coils to a degree predeterminable by the adjustment of said plug in said member, said member being adapted to receive a gravitational or other force or torque applied on said bar coincidentally with the axes of said armature and coils, said armature upon application of a force or torque on said bar being adapted to be shifted from its electrical zero center with respect to said coils.

3. A transmitter for use in a system for telemetering a condition, said transmitter comprising a base, a member having a control depending portion extending through a bore therein and having a lower split and interiorly screw threaded portion, a hollow bore plug receiving therein a driving coil and a pickup coil on each side thereof, means for adjusting and retaining said retainer and its coils in position in said plug, said plug being adjustably secured in said depending portion of said member, a ring positioned on the under side of said base and split to provide a means of retaining and clamping said plug in its adjusted positions, an outlet and contact members for the windings of said coils, said member having a portion inherently relatively compliant to a predetermined degree toward said base, an armature carried by said relatively compliant portion of said member and extending concentrically into said plug and with respect to the axis of said coils to a degree predeterminable by the adjustment of said plug in said member, said member being adapted to receive a gravitational or other force or torque applied on said bar coincidentally with the axes of said armature and coils, said armature upon application of a force or torque on said member being adapted to be shifted from its electrical zero center with respect to said coils.

4. A transmitter for use in a system for telemetering a condition, said transmitter comprising a base, a bar having a central depending portion extending through a bore therein and having a lower split and interiorly screw threaded portion, a hollow bore plug receiving therein a retainer with a driving coil and a pickup coil on each side thereof, an inner adjusting nut for retaining said retainer and its coils in position in said plug, said plug being adjustably screw threaded in said depending portion of said bar, a ring positioned on the under side of said base and split to provide a means of retaining and clamping said plug on its adjusted positions, an outlet and contact members for the windings of said coils, said bar having an upper portion inherently relatively complaint to a predetermined degree toward said base, an armature carried by said upper relatively complaint portion of said bar and extending concentrically into said plug and with respect to the axis of the coil retainer and its coils to a degree predeterminable by the adjustment of said plug, said bar being adapted to receive a gravitational or other force or torque applied on said bar coincidentally with the axes of said armature and coils, said armature upon application of force or torque on said bar being adapted to be shifted from its electrical zero center with respect to said coils.

5. A transmitter for use in a system for telemetering a condition, said transmitter comprising a base, a bar having a central depending portion extending through a bore therein and having a lower split and interiorly screw threaded portion, a hollow bore plug receiving therein a retainer with a driving coil and a pickup coil on each side thereof, an inner adjusting nut for retaining said retainer and its coils in position in said plug, said plug being adjustably screw threaded in said depending portion of said bar, a ring positioned on the under side of said base and split to provide a means of retaining and clamping said plug in its adjusted positions, an outlet and contact members for the windings of said coils, said bar being provided with an interior horizontal slot rendering one portion thereof inherently compliant to a predetermined degree, an armature carried by said relatively compliant portion of said bar and extending concentrically into said plug and with respect to the axis of the coil retainer and its coils to a degree predeterminable by the adjustment of said plug, said bar being adapted to receive a gravitational or other force or torque applied on said bar coincidentally with the axes of said armature and coils, said armature upon application of force or torque on said bar being adapted to be shifted from its electrical zero center with respect to said coils.

JOSEPH J. NEFF.

REFERENCES CITED

The following references are of record in the file of this patent:

UNITED STATES PATENTS

| Number | Name | Date |
| --- | --- | --- |
| 2,364,237 | Neff | Dec. 5, 1944 |
| 2,370,073 | Reason | Feb. 20, 1945 |
| 2,417,097 | Warshaw | Mar. 11, 1947 |